Maria Panerai and
Giuseppe Panerai
INVENTORS

BY Wenderoth, Lind
and Ponack,
attorneys

INVENTORS
Maria Panerai and Giuseppe Panerai
BY Wenderoth, Lind and Ponack, attorneys Maria Panerai and
Giuseppe Panerai
INVENTORS BY Wenderoth, Lind
and Ponack, attys.

United States Patent Office 3,393,337
Patented July 16, 1968

3,393,337
ELECTROLUMINESCENT DEVICES

Maria Panerai and Giuseppe Panerai, both of 2 Piazza Galileo Ferraris, Florence, Italy Filed Jan. 14, 1964, Ser. No. 337,669
Claims priority, application Italy, Apr. 6, 1963, 6,695/63; Oct. 29, 1963, 21,993/63; Nov. 29, 1963, 24,314/63
3 Claims. (Cl. 313—108)

ABSTRACT OF THE DISCLOSURE

An electroluminescent device comprising a first transparent dielectric layer, a second transparent dielectric layer, a spacer layer between said first and second dielectric layers at the marginal portions thereof and spacing said dielectric layers, a first conductive layer interposed between said dielectric layers, an electroluminescent layer applied to at least one free face of one of said dielectric layers, a second conductive layer applied to said electroluminescent layer, a third transparent dielectric layer applied to said second conductive layer, means engaging said layers and sealing the marginal portions of said layers, and two electric conductors one connected to each of said conductive layers.

The present invention relates to an improvement in electroluminescent devices.

One object of this invention is that of obtaining electroluminescent devices in the form of sheet material having a minimum thickness, said devices being flexible and capable of being cut to any desired shape.

Another object of this invention is that of obtaining devices of the involved kind, capable of being mounted also on curved surfaces, the cost of manufacture of said devices being decidedly lower than that of the similar devices known up to now.

Another object of this invention is that of embodying tapes, sheets or devices wherein the electroluminescent effect is obtained on both faces.

Another object of this invention is that of providing electroluminescent devices which are extremely simple, which have a low cost and a very high luminous yield.

Another purposes of this invention is that of allowing the electroluminescent panels to be formed on any kind of either insulating or conductive surface, no matter what the dimensions or geometrical shapes, and whether the concerned surface is movable or stationary. In fact, due to the material according to this invention, it is possible to embody electroluminescent surfaces on brickwork walls, on signal poles made of either concrete or metal or wood and already in place, on road side concrete walls, on posts for road signals and on any other surface outside or inside of metal or brickwork buildings. Also textile fabrics and flexible materials can be rendered electroluminescent.

Another purpose of this invention is that of obtaining transparent conductive materials, which, differently from those known up to now, which are rather brittle, have the features of being absolutely infrangible, with high luminous yield and a low cost of manufacture.

A further purpose of this invention is that of embodying conductive materials of the concerned kind, capable of being manufactured in tape, sheet or size form, having any sizes and a very reduced thickness and suitable to be cut or sheared to any desired shape and design.

A further purpose of this invention is that of providing a process for the manufacture of the above disclosed conductive materials.

According to this invention a device is provided comprising a pair of transparent conductive layers between which is interposed a dielectric layer carrying on either one face or both faces a thin deposit of electroluminescent material, and a pair of thin protective dielectric transparent layers, applied to the outer faces of the unit.

In one embodiment of this invention, the device is obtained by making one of the conductors a transparent gelatinous material, or an aqueous solution having a good electric conductivity.

According to another embodiment of this invention, the conductive material consists of powder or small beads of either glass or a material having an analogous behaviour, rendered conductive by a thermal treatment by metal salts or by metal deposition under high vacuum. Besides the glass it is possible to use for the purposes of this invention, silica, quartz, porcelain, marble and other transparent or translucent materials or materials allowing the light to pass to a sufficient extent. In case of deposition under high vacuum, it is possible to use plastic material, for instance "Plexiglas."

According to another embodiment of this invention, the transparent conductive material consists of a dielectric material, for instance glass or transparent plastic material in filament, sheet, fiber, yarn or fabric form, rendered conductive by the application of a thin coating of a metal oxide or of a mixture of metal oxides.

According to another embodiment of this invention, the transparent conductor is embodied by a metal powder uniformly distributed directed onto the still fresh electroluminescent layer, or spray or brush applied onto the dry electroluminescent layer, by means of an adhesive.

In a further embodiment of this invention, the transparent conductive material is obtained by means of very thin metal foils, plasticized or stuck to a plastic support by means of an adhesive.

In a still further embodiment of this invention, the transparent conductive material is obtained from a metallized plastic support, the metal layer being there submitted to an abrasive mechanical action or other chemical etching, until the thickness of said metal layer is reduced to a value for which said layer behaves as an optically transparent body, although remaining sufficiently conductive.

In a still further embodiment of this invention, the transparent conductive material consists of a layer of either glass or transparent plastic material, rendered conductive by means of a thin metal layer also transparent, applied to said dielectric support by deposition under high vacuum.

This invention will be hereinafter described with reference to the attached drawings showing by way of non limitative examples, some embodiments of the invention itself.

Figure 14:
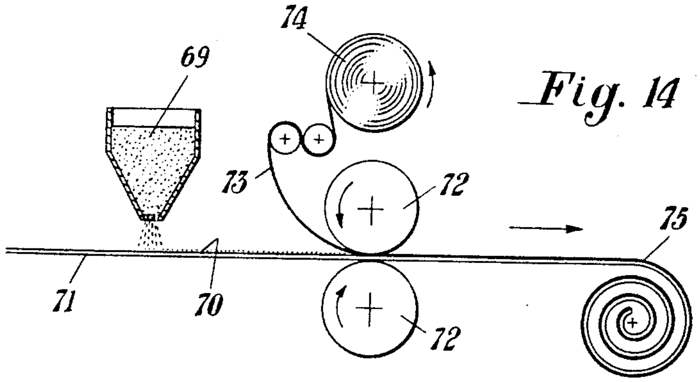

FIG. 14 diagrammatically shows an embodiment of a transparent electrode in continuous tape form.

Figure 15:
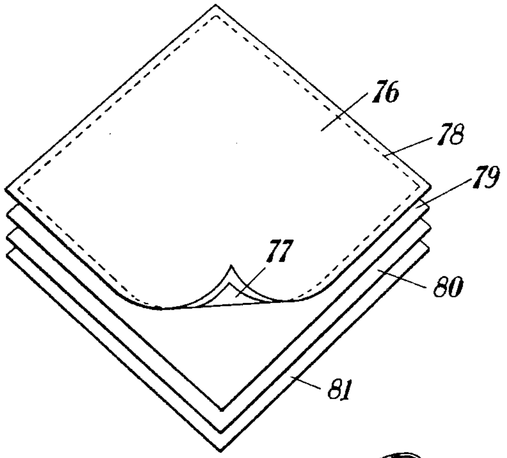

FIG. 15 is a perspective exploded view of another electroluminescence device embodied according to this invention.

Figure 16:
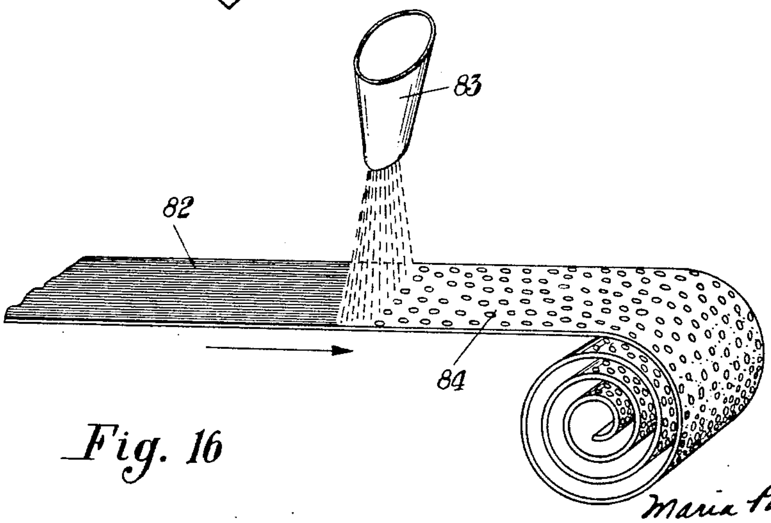

FIG. 16 diagrammatically shows another system to obtain a transparent conductor in the shape of a continuous tape.

The devices which will be described can be applied in very numerous technical cases; only by way of example, it will be possible to cite the illumination of control boards, dials for measuring instruments, indicating signals generally and so on.

Figure 1:
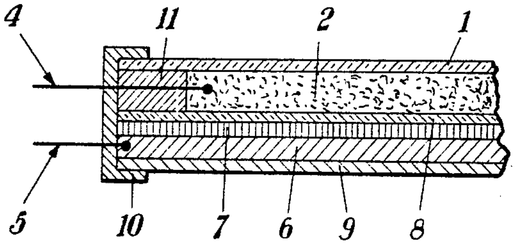
FIG. 1 is a partial sectional view on an enlarged scale, of an electroluminescent structure according to this invention.

With reference to FIG. 1 the numeral 1 indicates a transparent dielectric protective layer, under which is located a transparent conductive layer 2 consisting of gelatin and connected to the feeding cable 4. The other feeding cable 5 is connected to a layer 6 of conductive material (either metal or plastic material metallized under high vacuum, or an insulating layer coated with a conductive varnish) whereon a thin layer 7 of an electroluminescent material (phosphors or electroluminescent sulphides, etc.) is applied.

Between the active layer 7 and the gelatin 2 a transparent dielectric layer 8 is interposed and finally under the conductive layer 6 a last protective layer 9 is applied, also the latter layer being dielectric and either transparent or opaque. The unit is hermetically sealed by a shaped edge 10. Between the edges of layers 1 and 8 a spacer layer 11 is interposed.

The structure shown in FIG. 1 lends itself to be embodied in many shapes and sizes; further, due to its flexible nature, it can be adapted to any surface, either flat or curved, since also extremely small thicknesses can be obtained.

Figure 2:
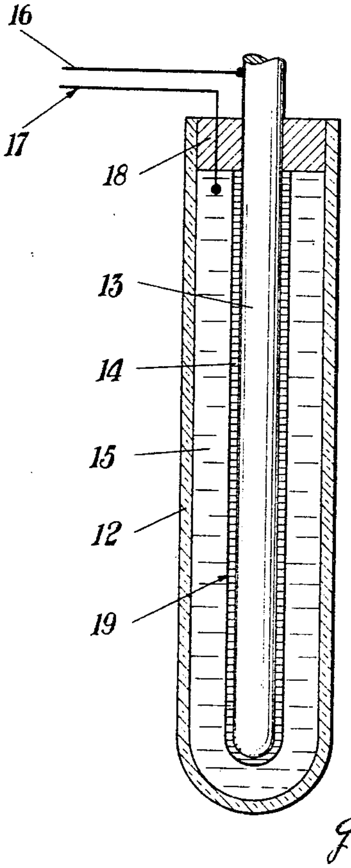
FIG. 2 is a sectional view of an electroluminescence lamp obtained according to this invention.

FIG. 2 shows an electroluminescence lamp embodied according to this invention.

In said FIG. 2 a transparent casing 12 has been shown and into said casing a pipe 13 is introduced, said pipe being of either metal or a dielectric material coated with a layer of conductive material, whereon is applied a thin layer of electroluminescent material 14, protected by an insulating transparent coating 19. The space 15 existing between the electroluminescent layer 14 and the casing 12 is filled with a conductive transparent liquid (an aqueous solution, coloured, if the case may be, water, and so on) or with a gelatin like the preceding case.

The two feeding conductors 16 and 17 are connected to the pipe 13 and to the conductive liquid or gelatinous part 15. In the upper part of the casing 12 a sealing closure 18 is provided.

In order to obtain an optically transparent conductive layer, any conventional gelatin can be used, as available on the market and used for other applications. Optimum results have been obtained by the optically transparent conductive gelatin, marketed by the Firm Panerai, owned by the applicants, and consisting of a mixture of isinglass and glycerin in substantially equal parts.

According to another embodiment of this invention, there is used a fine glass powder which is heated up to 500°–800° C. While the powder is maintained at this temperature, a solution of a metal salt is sprayed onto the powder. The thus formed oxide coats with a very thin layer the single glass grains or beads which become conductive although remaining practically transparent. This conductive powder, applied in a thin layer, allows a transparent conductive electrode to be embodied. The application can be embodied in any suitable way, for instance forming a varnish with said powder.

In case of another raw material, a suitable temperature for forming the layer of metal oxide on the involved layer will be selected. Both in cases of thermal treatment and of deposition under high vacuum, the particles are stirred so as to cause the metallization to occur throughout the surface.

Figure 3:
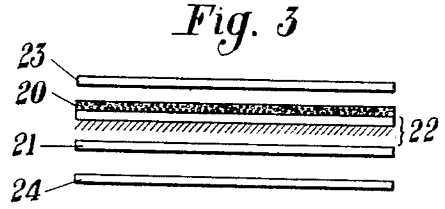
FIGS. 3 to 9 show diagrammatical sectional views of certain electroluminescent units which can be embodied according to this invention.

In the device shown in FIG. 3 which is, like the subsequent figures, a sectional enlarged diagrammatical view, a layer 20 is provided, made of powder or little beads of metallized glass (or any other material according to the invention) applied onto a layer 22. This application can be effected by pressing; or the powder and the beads can be previously united by means of plastic binders in order to form a paste which is conductive or varnish which is applied by a brush, or by spraying or by any other analogous system; or the beads are smeared or uniformly distributed on a dielectric varnish when the latter is still not entirely set, or smeared or uniformly distributed on a thin layer of transparent adhesive applied to the electroluminescent layer when the latter is entirely set; or on the inner surface of the transparent protection 23. The application can also be carried out onto the surface of a transparent material carrying an adhesive or a layer which can be hot plasticized.

The numeral 22 denotes in this figure, a layer of dielectric material containing the electroluminescent substance, or consisting of two layers intimately connected to one another, one of said layers consisting of pure dielectric (either film or varnish) while the other layer consists of electroluminescent substance.

The numeral reference, 21, denotes a conductive layer which can be either transparent, like the layer 20, or opaque and reflecting, for instance consisting of metal varnishes and generally of electric current conductive substances (also a solid metal body).

The outer layers 23 and 24 are made of insulating material, at least one of said layers being transparent, and serves the sole purpose of coating and protection.

The unit can be applied onto surfaces either flat or curved, or having the most complicated configuration, starting from the lower layer and superposing the subsequent layers, with no need of removing the base support, for instance that shown at 24, which can consist of any kind of material, for instance a brickwork wall, an insulating plate or a metal plate, the latter being rendered insulating, if necessary, by an insulating varnish, as a preparation step for receiving the support surface.

By using the type of transparent conductor according to the present invention, and by the arrangement generally illustrated in FIG. 3, it will be possible to embody electroluminescent panels of various kinds.

Figure 4:
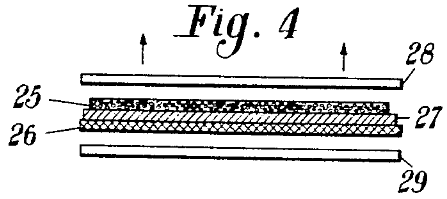

In FIG. 4 a metal support electroluminescent panel has been shown. In this figure, 25 shows the material according to this invention, 26 is the nontransparent metal electrode, 27 is the electroluminescent substance carried by a dielectric, 28 is a transparent insulating protection, and 29 an insulating protection. In this case the light will be emitted in the direction as shown by the arrows.

Figure 5:
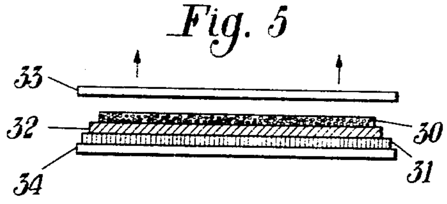

FIG. 5 shows an embodiment of an electroluminescent panel with a support made of plastic material. The material according to the present invention has been shown at 30; 31 is an electrode made by a metal conductive varnish on the base support, and 32 is the electroluminescent substance carried by a dielectric, 33 is an insulating transparent protection layer and 34 is a support made of plastic material. The light will be emitted in the direction as shown by the arrows. If the protection layer 33 and support 34 consists of a tape whose outside is adhesive, a unit will be obtained which can be directly applied onto any support. If the protection layer 33 is against the support, the support layer will have to be transparent.

Figure 6:
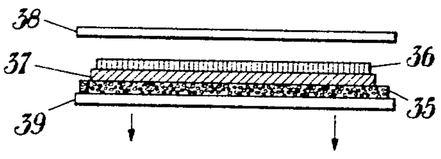

FIG. 6 shows another type of electroluminescent panel with a support made of plastic material. 35 is the material according to this invention, 36 is an electrode of metallic conductive varnish on the electroluminescent layer, 37 is the electroluminescent layer carried by a dielectric, 38 is an insulating protection, 39 is a support made of transparent plastic material. The light is emitted in the direction as shown by the arrows.

Figure 9:
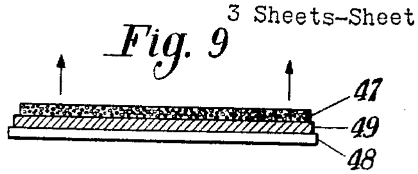
Figure 7:
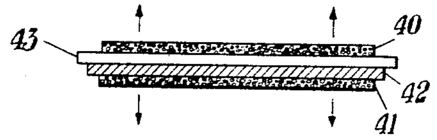
Figure 8:
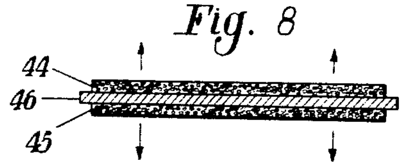

FIGS. 7, 8 and 9 show electroluminescent panels embodied by polyester films (Mylar, Montivel etc.) used either as a dielectric or as a conductive support.

In FIG. 7, 40 is the material according to this invention, 41 is another layer of said material, 42 is the electroluminescent substance carried by the dielectric, and 43 is an insulating plastic film having a minimum thickness.

In FIG. 8, the material according to this invention has been denoted by 44 and 45; 46 is a plastic material film into which is incorporated the electroluminescent substance.

In FIG. 9, 47 is the material according to the present invention, 48 is a film of plastic material whose upper surface is metallized and 49 is the electroluminescent substance carried by a dielectric.

Figure 10:
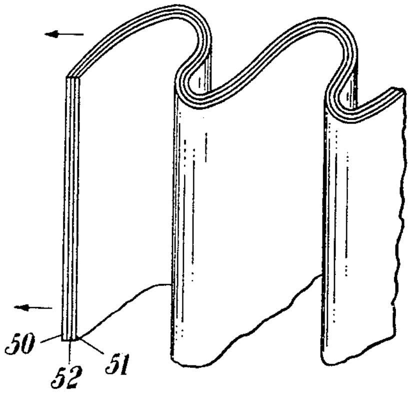
FIG. 10 shows an embodiment of the electroluminescence on an extended surface flexible material.

In FIG. 10, 50 is the material according to this invention, 51 is the flexible material (for instance a textile fabric or paper) metallized by conductive varnishes or by the material according to this invention, and 52 is the electroluminescent substance carried by a flexible and elastic dielectric. The unit is suitably insulated externally on both sides.

Figure 11:
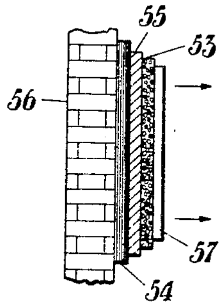
FIGS. 11 and 12 show an embodiment of electroluminescent panels on stationary supports.

In FIG. 11, 53 is the material according to the present invention, 54 is a conductive surface, for instance a varnished surface, 55 is the electroluminescent substance carried by a dielectric, 56 is the stationary support which in this case consists of a brickwork, wood panels or insulating surfaces generally, 57 is the protective varnish.

Figure 12:
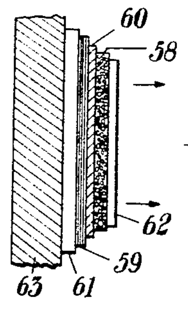

In FIG. 12, 58 is the material according to the present invention, 59 is a conductive surface obtained by varnishing, 60 is the electroluminescent substance carried by a dielectric, 61 is an insulating protection obtained by varnishing, 62 is an insulating protection obtained by varnish and 63 is the (metal) conductive backing surface. In particular cases, of course, it is possible to dispense with the layers 59 and 61.

The panels as shown in FIGS. 11 and 12 are embodied, according to this invention, as follows.

A conductive surface is prepared by applying a conductive metallic varnish either directly, as shown in FIG. 11, or after the application of a preliminary insulating layer when necessary, as shown in FIG. 12. Then, by a brush, or by spray or by another system, the layer of electroluminescent substance contained in the dielectric is applied. Subsequently, either directly by a brush, or by spray, or by another system the metallized powder according to this invention, already bound by a binder will be applied, or said metallized powder will be indirectly applied onto an adhesive transparent varnish previously applied, for instance by smearing.

Using the material according to this invention of course it will be possible to form also electroluminescent letters, numbers and various signs or indications.

Figure 13:
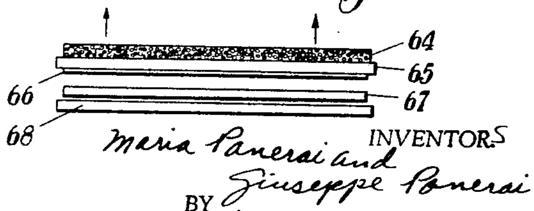
FIG. 13 shows the application on an adhesive tape.

As shown in FIG. 13 the application of the material according to this invention onto the surface prepared with the electroluminescent substances can be carried out also by a previous preparation of conductive transparent layers on dielectric adhesive tapes. In said figure, 64 is the metallized glass powder, 65 is a tape of dielectric material and 66 is the adhesive substance. 67 is the electroluminescent substance carried by a dielectric and 68 is the electrode either of metal or conductive varnish. It is evident that it will be possible to prepare also pressure adhesive tapes having incorporated therein the transparent conductive powders according to the present invention.

In the drawings, which are quite diagrammatic, there have been omitted for the sake of simplicity, the electric connections of the two electrodes between which is located the electroluminescent substance. On the other hand said connections do not form part of this invention.

As aforesaid, the material according to this invention can be used in other cases where a conductive material or a weakly conductive material is required having the particular features as disclosed hereinbefore, even in those cases where the transparency is not expressly needed.

As disclosed in the preamble, the conductive transparent material can be embodied by a thin layer of metal powder, such as for instance gold, silver, copper, aluminum and so on, uniformly distributed directly on the still fresh electroluminescent layer, or, if said layer is dry, with the interposition of a thin layer of an adhesive. Alternatively, the metal powder can be applied on a transparent plastic support treated so as to obtain the anchoring of the powder by hot polymerization, or by an adhesive. It will be possible to apply to said plastic support a metal layer, the electroluminescent layer, and subsequently the second conductor, either opaque or also transparent.

With reference to FIG. 14, the metal powder contained within the reservoir 69 is uniformly distributed for instance by a vibrator, onto the plastifiable surface 70 of a transparent plastic tape 71 moving, at a uniform speed, between two heated pressure rollers 72. When passing between the rollers 72, onto the thin powder deposit, a protective plastic sheet 73 is superposed, said sheet coming from a roll 74, free from plastifying substance. Thus a continuous coil 75 of transparent conductive material will be obtained, and said material will be able to be used for the embodiment of electroluminescence devices. At the moment of its use, it will be sufficient to remove the protective layer 73 and any metal powder excess.

FIG. 14 shows a device for producing the transparent conductive material in continuous tape form, it being however understood that said system lends itself to the manufacture of conductors in the form of stripes, sheets, bars and the like.

In another embodiment, a very thin and transparent metal foil is laid on a transparent plastic support carrying on one of its faces an applied layer of a hot plastifiable material, for instance a "Mylar" or "Montivel" tape, coated with a thin polyethylene layer. The unit will be introduced between the heated pressure rollers of a rolling mill and the metal foil is left to hot plastify so that there is produced a sheet or tape which is transparent, conductive on one face and protected by an insulating plastic material on the other face.

Now, it will be noted that, by overlying, it will be possible to change the transparency value, according to preestablished zones or patterns provided on said metal foil, whereby it will be possible to obtain electroluminescent devices or panels having particular decorative effects.

The FIG. 15 diagrammatically shows an electroluminescence device obtained according to the above disclosed system.

In this case from the top down, there are: the plastic layer 76 carrying on its lower face 77 the plastifiable matter, which serves for anchoring a thin metal foil 78.

Under said element there is a layer 79 of active material, such as for instance the electroluminescent phosphor with a dielectric film, if the case may be, then there is a conductive layer 80 transparent, if the case may be, and finally the protective insulating layer 81. Thus a very thin, very flexible unit is obtained which can be cut to any shape and size. The fundamental feature of the unit, as above disclosed, consists in having rendered practically infrangible the metal foil which is per se very brittle.

In order to embody electrodes having an unlimited length or at least large dimensions, such as cannot be easily manufactured by the present techniques for producing thin and transparent metal depositions under high vacuum, according to this invention there can be used as raw material, metallized tapes or sheets, as available on the market, wherefrom by mechanical abrasion or by chemical etching, is removed the plastic material to such an extent as to give said sheets or foils the desired transparency value, although maintaining the electrical conductivity.

On the transparent plastic sheet or tape, shown at 82 in FIG. 16, which is coated with a relatively thick metal layer, by a suitable device denoted by 83, a weak abrasive in powder form is thrown, taking care to carry out said operation in a uniform way by means of suitable means capable of controlling the direction and the pressure of the abrasive jet, the forward movement of the tape 82 and so on. This operation is continued and repeated until there are obtained the desired values of transparency and electrical conductivity. The thus thinned metal layer, shown in 84 in FIG. 16, can be coated by a thin film of transparent dielectric varnish, either by spray, or by atomization. The purposes of this varnish are those of rendering stronger the conductive layer and forming a dielectric barrier layer between the two electrodes, besides the layer of bound phosphor. On to the above described unit, are applied the electroluminescent phosphor layer and the second electrode, and the possible insulating outer protection layers, made of plastic transparent material.

It is to be noted that an electroluminescence device of the concerned kind affords a remarkable feature of safety of operation. This is because the discharge between the two electrodes forming the device, if it occurs, is deadened at once by the phenomenon of "cicatrization" due to local melting of the material due to the discharge without affecting the luminous yield of the system.

Another embodiment of this invention provides a transparent electrode using as a support glass or plastic material in fiber, filament or fabric form, rendered conductive by a metal deposit obtained under vacuum. A glass fiber (or plastic material) fabric, of kind available on the market, after the removal of the possible sizing by means of solvents or other suitable treatment, will be washed, de-greased and rendered conductive by a treatment by metal salts in order to form a film of conductive and transparent metal oxide.

The thus treated fabric will be plastified on one side only by means of sheets or tapes of transparent plastic material, coated on one side with hot plastifiable material in order to render it strong and at the same time flexible the glass fiber fabric. The fabric will be finally coated with electroluminescent phosphor bound with a suitable dielectric and on the latter layer the second electrode will be applied, for instance by varnishing with silver conductive varnishes, or aluminum varnishes and so on.

The light emission in this case will occur through the plastified element which forms also a sufficient protection both as insulating element and as tight sealing element.

On the side of the metal varnishing, forming the second electrode, it will be possible to carry out a second plastifying operation, in order to complete both the seal and the insulation.

In any case the materials obtained according to this invention lend themselves to making flat surfaces and corrugated surfaces to be used in the embodiment of devices serving the purposes of electroluminescent devices and of refracting devices. In this case it will be sufficient to have recourse to the previous hot moulding of the dielectric support (glass, plastic and the like) in order to impart to said support the desired refracting corrugated surface and to apply then the conductive layers and the active electroluminescent layers according to the techniques as above disclosed.

The present invention has been illustrated and described in certain preferred embodiments, it being however understood that practically constructive variations might be adopted without departing from the scope of the invention.

We claim:

1. An electroluminescent device comprising a first transparent dielectric layer, a second transparent dielectric layer, a spacer layer between said first and second dielectric layers at the marginal portions thereof and spacing said dielectric layers, a first conductive layer interposed between said dielectric layers, an electroluminescent layer applied to at least one free face of one of said dielectric layers, a second conductive layer applied to said electroluminescent layer, the electroluminescent layer being between the conductive layers, at least one of said conductive layers being a transparent conductive liquid, a third transparent dielectric layer applied to said second conductive layer, means engaging said layers and sealing the marginal portions of said layers, and two electric conductors one connected to each of said conductive layers.

2. An electroluminescent device as claimed in claim 1, wherein said transparent conductive liquid is a gelatinous substance consisting of a mixture of isinglass and glycerin in substantially equal parts.

3. An electroluminescent device as claimed in claim 1, wherein said transparent conductive liquid is an aqueous solution.

References Cited

UNITED STATES PATENTS

| | | | |
|---|---|---|---|
| 2,981,858 | 4/1961 | O'Connell | 117—33.5 X |
| 3,048,731 | 8/1962 | Lehmann | 117—33.5 X |
| 3,070,722 | 12/1962 | Bouchard | 117—33.5 X |
| 3,074,816 | 1/1963 | Blazek | 117—33.5 X |
| 3,161,797 | 12/1964 | Buller et al. | 117—33.5 X |
| 3,167,677 | 1/1965 | Fremuth | 117—33.5 |
| 3,244,556 | 4/1966 | Mytych | 117—212 |
| 3,252,845 | 5/1966 | Schindler et al. | 117—33.5 X |

FOREIGN PATENTS

| | | |
|---|---|---|
| 1,106,600 | 5/1961 | Germany. |

WILLIAM L. JARVIS, *Primary Examiner.*